3,088,825
PRESSURE ROASTING OF COFFEE
Harry H. Topalian, Pearl River, N.Y., and Varnum D. Ludington, Greenwich, Conn., assignors to General Foods Corporation, White Plains, N.Y., a corporation of Delaware
Filed May 15, 1962, Ser. No. 196,845
3 Claims. (Cl. 99—68)

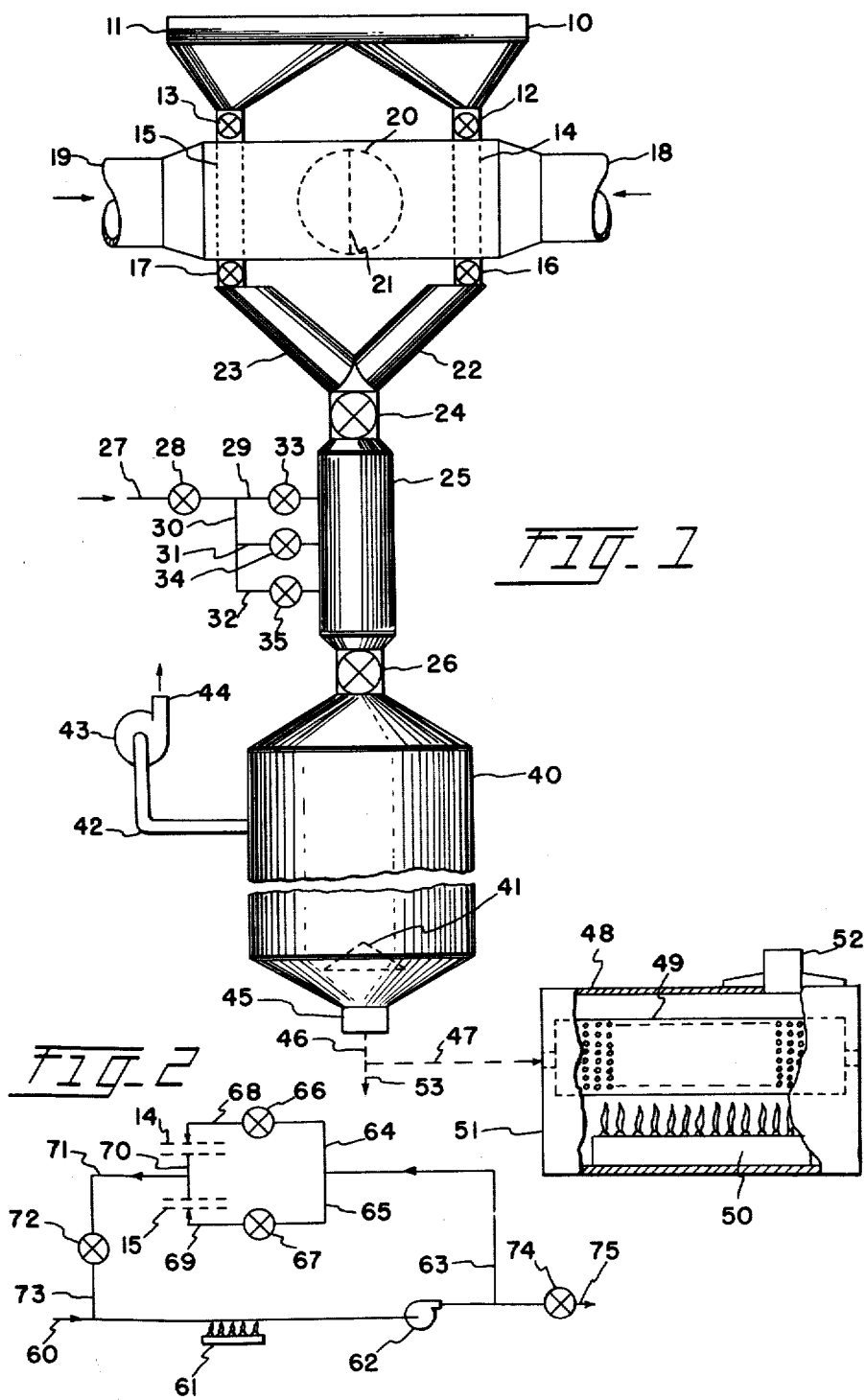

This invention relates to the roasting of whole green coffee beans under conditions of relatively high pressures and short roasting times. It particularly relates to the production of roasted coffee having a high soluble solids content so as to be suitable not only for making regular brews but also for making soluble coffee, that is, coffee powder which dissolves instantly on the addition of hot water. The present application is a continuation-in-part of Serial No. 42,406, filed July 12, 1960, now abandoned.

Briefly, the invention involves a process for roasting whole green coffee beans at an increased rate in a roasting cycle comprising a preheating period and a roasting period. The roasting period is particularly characterized by the use of the highest temperatures and pressures in the cycle and by the fact that the moisture content is the highest during the cycle. Whole green beans are charged to a preheating zone and preheated to a bean temperature of, say 240° to 390° F. for a time period of 1 to 3 minutes and at substantially atmospheric pressure, after which the beans are fed in their heated state to a roasting chamber and heated to a bean temperature of 370° to 550° F. at a pressure of 190 to 1030 p.s.i.g. for a time of about 0.3 to 2 minutes. These conditions will vary somewhat depending on the bean variety, the desired roast characteristics and whether the steam is saturated or superheated. At the end of the roasting cycle, the pressure on the beans in the chamber is suddenly released and coincidentally therewith the beans are cooled to stop the roasting reaction by discharging the contents of the chamber into an expansion zone where the beans are collected. There is recovered as product roasted beans having a soluble solids content of about 30 to 40% by weight, such product having a soluble solids content substantially higher than conventionally roasted beans. The soluble solids content by weight of such product may be in the order of 10–50% higher than that of conventionally roasted coffee.

Considering the invention in detail, it is applicable to the roasting of coffee generally. More particularly, the process is applicable to attainment of maximum puffing during roasting of coffee beans where there is usually a wide variation in the degree of puff obtained in conventional roasting. As a result of such improved puffing it has been found that the acidity and flavor characteristics of such coffee beans are improved. Not only is the bean flavor improved in the case of many varieties of coffee, but in addition the roasting rate is substantially increased over that of conventional production roasting. Furthermore, the soluble solids content and cup strength of coffee beans treated by the invention are increased.

Blends of coffees may also be improved by comparison with the products of conventional roasting.

The invention may be better understood by referring to the accompanying drawings wherein:

FIG. 1 is a diagrammatic view illustrating the steps in the process, and

FIG. 2 is a diagrammatic view showing the flow of heat exchange fluid for preheating the beans.

Referring to FIG. 1, the coffee to be roasted is charged to feed hoppers 10 and 11 having tapered bottom outlets which are adapted to feed coffee through valves 12 and 13 to preheaters 14 and 15. Although for illustrative purposes only two hoppers and preheaters are shown, the number is variable. It will be understood that if only a single preheating chamber is desired, then one of the air conduits 18 or 19, one of the valves 12 or 13 and one of the valves 16 or 17 would be unnecessary. Preheaters 14 and 15 comprise chambers having perforated walls to permit entry of hot gas, preferably a mixture of hot air and combustion gases, for preheating the coffee beans in the tubes. A charge of beans is introduced into a preheater, say the preheater 14, by opening valve 12, the valve 16 being closed. The valve 12 is then closed and the charge is heated by means of the hot gas flowing through conduit 18, the gas leaving the preheater and passing out through the exit conduit 20. A partition 21 prevents the exiting gases from entering the conduit 19 of preheater 15.

Preheating is usually carried out at atmospheric pressures. The preheating gas is maintained at a temperature of 250° to 450° F., preferably 380° to 410° F. At these temperatures the gas will preheat the beans in 1 to 3 minutes to a temperature of 240° to 390° F., preferably 375° F. Although bean temperatures as high as 400° F. can be employed, it is preferred to limit the temperature to avoid actual roasting in the preheater while at the same time securing the maximum preheating in the shortest time. The relationship of time to temperature is an inverse one.

The preheated charge is removed from tube 14 through valve 16 and passed into the downspout 22 which transfers it through valve 24 to a closed pressurized roasting zone or chamber in the form of the column 25. The latter comprises a substantially tubular vertical chamber of approximately uniform diameter throughout its length except for some restriction at the ends where they are connected to the valves 24 and 26, respectively. The passages through each of the valves 24 and 25 are almost equal in diameter to the tubular chamber so that there is little or no tendency to restrict the free flow of the coffee charge into, through, and out of the chamber.

A pressurizing and heating fluid, preferably steam, is admitted to the chamber 25 through a supply pipe 27 controlled by valve 28 and then through any or all of lines 29, 30, 31 and 32 controlled by valves 33, 34 and 35.

The steam temperature in column 25 is 370° to 600° F., preferably 390° to 550° F., while the pressure may vary from 190 to 1030 p.s.i.g. although preferably it is 200 to 250 p.s.i.g. The steam may be saturated, or may have varying degrees of superheat. Under the preferred temperatures the beans will usually be heated to 380° F. to 405° F. Preferably, superheated steam is employed. Duration of the heating in the column may be as low as 20 seconds and up to 4 minutes; usually it varies from 1 to 2 minutes.

It will be understood that as a charge of beans is undergoing roasting in column 25, another charge is being heated in preheater 15 and still another charge is being introduced to the preheater 14. As is apparent, the charge in preheater 15 is introduced thereto by hopper 11 and valve 13, and it is preheated by hot gases flowing in conduit 19 through perforations in preheater 15, after which such gases exit through the opening 20, the partition 21 preventing the entry of the gases to conduit 18. The preheated charge is, in due course, passed to chamber 25 through valve 17, downspout 23, and valve 24.

At the end of a roasting period the valve 26 is opened quickly and the roasted beans are expelled from column 25 by virtue of the pressure in the column. The valve 26 then closes and valve 24 opens to permit the preheated charge from preheater 15 to drop by gravity through downspout 23 into the column 25. Valve 24 then is closed, preheating of the charge in tube 14 begins, and a fresh charge is introduced to the tube 15.

The expansion chamber 40 comprises an enlarged zone of lower pressure, usually atmospheric pressure. The introduction of the roasted beans to chamber 40 is accomplished quickly, the passage of the beans being explosive-like owing to the sudden release of the pressure in column 25. The expansion of the gases has an expanding effect on the beans, and they become puffed or enlarged in size. The falling beans strike the inverted baffle cone or dish 41 which checks their fall and spreads their flow, and the beans are removed from the chamber through the outlet 45. Gaseous materials are vented through line 42 by means of the blower 43 and line 44. As these latter gases have heat energy, they are desirably reused in the process to recover such energy.

As is apparent, the preheated charge passes from the preheating apparatus through the pressurizing chamber and to the expansion chamber in a straight, vertical, downward path. The vertically downward direction of movement of the charge makes it possible to move the charge by gravity, with elimination of moving conveyor-type equipment, and also makes it possible to move the charge from one zone to another not only rapidly but also automatically. This is advantageous in the interest of maximum utilization of equipment, conservation of preheat, and avoidance of losses incident to transfer of the charge from one point to another by conventional conveying means.

The chamber 25, as may be seen, is simply defined as a pressure zone having an inlet valve at one end and an outlet valve at the other. The chamber has a rapid throughput, which may be automatically controlled; in other words, automatic controls may regulate the steam pressure and, by means of gate and cock valves, the length of time the beans remain in the chamber and also the preheater.

Referring to the preheating and roasting conditions, it will be understood that by heating at the temperatures and for the times and pressures noted, a complete roast can be carried out. If desired, a roast may be performed to achieve a particular color in the roasted coffee, ranging say from light to dark and including any desired intermediate shade.

In FIG. 2 there is shown a schematic view of the air flow in the preheating system. Air is drawn into the intake line 60, heated by the burner or furnace 61 and then passed by blower 62 through lines 63 and 64, valve 66, and line 68 into the preheater 14 to preheat the beans. In this connection, line 68 corresponds to line 18 of FIG. 1. Air leaving the preheater 14 is recycled through lines 70 and 71, valve 72 and lines 73 and 60 to the furnace. It should be understood in the furnace 61 provision is made for the addition of hot combustion gases to the air stream in line 60. From time to time a portion of the mixture of gases in line 63 may be exhausted through valve 74 and line 75. When it is desired to preheat the beans in the preheater 15, the valve 67, which hitherto has been closed, is opened and the valve 66 is closed.

The moisture content of the beans during the over-all process in a consideration of importance. Initially, that is, before processing, the moisture content of the beans may be that of conventional green beans, say from 5 to 15% by weight. No extended green bean dehydration step is required.

In the roasting part of the cycle, that is, in the pressure chamber, it is desirable to have a relatively high moisture level to favor the production of soluble solids, and this aim is fulfilled by roasting with steam. At the same time, the moisture level should not be excessively high as otherwise the roasted product may tend to be wet, spongy, and give a brew having an under-roasted flavor and an excessive acidity.

The moisture level in the roasting step may be controlled to an extent in the preheating step by regulating the preheating temperature and time, and by maintaining a certain degree of superheat or a certain quality in the steam being injected into the roasting chamber. In other words, the more superheat in the steam, the less water will be added to the bean mixture at a particular steam pressure, and vice versa. The moisture level in the chamber may also be controlled to an extent by choosing green beans of different moisture levels.

Generally, after the preheating step, the moisture may range from 2% or even lower to 9 or 10% or more by weight. More preferably, it may range from 1.75% at an air preheating temperature of 450° F. up to 7–8% at an air preheating temperature of 290° F. After roasting in the pressure chamber the moisture level may range from 5 to 8%, and may be as low as 2 to 3%.

Among the characteristics of the roasted product, the roasted bean size is noteworthy, it having been found that the size is significantly greater than that obtained by conventional roasting, e.g. 1½–2 times larger. Thus, it is possible that the increased size or expansion of the bean may result in a more rapid rate of soluble solids extraction and thereby permit the use of milder extraction conditions with a resulting flavor quality improvement and savings in the cost of processing. The product breaks much more easily between the fingers and the density will vary from 0.3 to 0.4 gm./ml. It will be apparent that the increased soluble solids content has been developed by means of pressure, the confinement of the roast gases in the roast zone, and by control of the moisture during roasting.

The acidity of a brew made from coffee roasted according to the invention is increased over conventional brews. Also cup solids are consistently higher, and cup strengths are improved. In addition, the present method produces roasted coffee having a definitely high titratable acidity.

The invention may be illustrated by the following example:

EXAMPLE 1

A quantity of coffee beans was roasted in a two-stage roasting cycle, the pertinent data of which is set forth below, as follows.

*Table 1*

| | |
|---|---|
| Green bean: | |
|     Charge lbs | 15 |
|     Moisture, percent | 11.8 |
|     Density, gms./ml | 0.72 |
| Preheating conditions: | |
|     Temperature, ° F | 380–410 |
|     Time, minutes | 3 |
|     Moisture, percent after preheating | 6–7 |
| Roasting conditions: | |
|     Steam temperature, ° F | 525–540 |
|     Steam pressure, p.s.i.g. (superheated) | 190–210 |
|     Chamber pressure, p.s.i.g | 200 |
|     Chamber temperature, ° F | 380–385 |
|     Chamber time, minutes | 1.75 |
| Roasted bean characteristics: | |
|     Moisture, percent | 6.4 |
|     Density, gms./ml | 0.34 |
|     Soluble solids, percent | 3.47 |

The treated beans were founds to produce brewed coffee having greater acidity and higher cup strength than conventionally roasted beans.

The invention is not restricted to the specific details above set forth but is capable of obvious variations thereof without departing from its scope.

What is claimed is:

1. Process for roasting whole green coffee beans at an increased rate in a roasting cycle comprising a preheating period and a roasting period, said roasting period being characterized by the ue of the highest temperatures and pressures in said cycle and by the fact that the moisture content is highest during said period; which comprises charging whole green beans to a preheating zone and preheating the beans therein to a bean temperature of 240° F. to 390° F. for a time of 1 to 3 minutes, and at substantially atmospheric pressure; feeding the beans to a roasting chamber and heating the same to a temperature of 370° F. to 550° F. and at a pressure of 190 to 1030 p.s.i.g. for a time of about 0.3 to 4 minutes, thereby to roast the beans, then suddenly releasing the pressure in said chamber and coincidently therewith cooling said beans by discharging the contents of said chamber into an expansion zone where the beans are collected and recovering as a product roasted beans having a soluble solids content of about 30 to 40% by weight, said roasted product having a soluble solids content of up to 10–15% by weight higher than conventionally roasted beans.

2. Process for roasting whole green coffee beans at an increased rate in a roasting cycle comprising a preheating period and a roasting period, said roasting period being characterized by the application of the highest temperatures in said cycle and by the fact that the moisture content is highest during said period, which comprises charging whole green beans to a preheating zone, passing through the charge of beans heated air at a temperature of 380° F. to 410° F. for a time of about 1 to 3 minutes and at substantially atmospheric pressure to preheat the beans; feeding the beans by gravity to an upstanding roasting chamber and introducing thereto superheated steam at a temperature of 370° F. to 600° F. and a pressure of about 200–250 p.s.i.g. to heat the beans in said chamber to a temperature of 370° F. to 550° F., maintaining the beans in said chamber and in contact with said steam for a time of about 1 to 2 minutes, thereby to roast the beans, then suddenly releasing the pressure in said chamber and coincidently therewith cooling said beans by discharging the contents of said chamber by means of gravity and by the aid of the pressure of said steam, and introducing said chamber contents into an expansion zone where the beans are collected and gaseous material is separated and removed, thereby obtaining roasted beans.

3. Process for roasting whole green coffee beans at an increased rate in a roasting cycle comprising a preheating period and a roasting period, said roasting period being characterized by the application of the highest temperatures and pressures in said cycle and by the fact that the moisture content is higher than in said other periods, which comprises charging whole green beans having a moisture content of 5 to 15% by weight to a preheating zone to dispose the same in a body of substantial depth; passing angularly through the charge of beans heated air at a temperature of 380° F. to 410° F. for a time of about 1 to 3 minutes and at substantially atmospheric pressure to preheat the beans to a bean temperature of 375° F., said preheated beans having a reduced moisture content in the range of 2 to 10% by weight; feeding the beans by gravity to the upper end of a cylindrically shaped upstanding roasting chamber and introducing thereto superheated steam at a temperature of 390° F. to 550° F. and a pressure of about 200–250 p.s.i.g. to heat the beans in said chamber to a temperature of 380° F. to 405° F., maintaining the beans in said chamber and in contact with said steam for a time of about 1 to 2 minutes, thereby to roast the beans, then suddenly releasing the pressure in said chamber and coincidently therewith cooling said beans by discharging the contents of said chamber through the lower end thereof by means of gravity and by the aid of the pressure of said steam, and introducing said chamber contents into an expansion zone where the beans are collected and gaseous material is separated and removed, thereby obtaining roasted beans having a soluble solids content of about 30 to 40% by weight.

References Cited in the file of this patent

UNITED STATES PATENTS 2,278,473    Musher    Apr. 7, 1942

OTHER REFERENCES

"Coffee the Beverage," 1925, by Foot, The Spice Mill Publishing Co. (New York), page 69.

UNITED STATES PATENT OFFICE
CERTIFICATE OF CORRECTION

Patent No. 3,088,825                                                           May 7, 1963

Harry H. Topalian et al.

It is hereby certified that error appears in the above numbered patent requiring correction and that the said Letters Patent should read as corrected below.

Column 3, line 58, for "in" read -- is --; column 4, line 32, for "high" read -- higher --; line 60, for "3.47" read -- 34.7 --; line 71, for "ue" read -- use --; column 5, line 13, for "10-15%" read -- 10-50% --.

Signed and sealed this 12th day of November 1963.

(SEAL)
Attest:

ERNEST W. SWIDER                                    EDWIN L. REYNOLDS

Attesting Officer                            Acting    Commissioner of Patents